United States Patent [19]
Lazzari et al.

[11] Patent Number: 4,464,447
[45] Date of Patent: Aug. 7, 1984

[54] RECHARGEABLE LITHIUM BATTERIES WITH NON-METAL ELECTRODES

[75] Inventors: Mario Lazzari, Pavia; Bruno Scrosati, Rome, both of Italy

[73] Assignee: Consiglio Nazionale Delle Ricerche, Rome, Italy

[21] Appl. No.: 337,381

[22] Filed: Jan. 6, 1982

Related U.S. Application Data

[63] Continuation-in-part of Ser. No. 178,775, Aug. 18, 1980, abandoned.

[30] Foreign Application Priority Data

May 13, 1980 [IT]   Italy ............................. 22004 A/80

[51] Int. Cl.³ ............................................. H01M 4/40
[52] U.S. Cl. ...................................... 429/194; 429/218; 429/221
[58] Field of Search ............... 429/194, 218, 221, 223; 252/182.1

[56] References Cited

U.S. PATENT DOCUMENTS

| | | | |
|---|---|---|---|
| 3,998,658 | 12/1976 | Dey | 429/194 |
| 4,035,555 | 7/1977 | Murphy et al. | 429/194 |
| 4,194,062 | 3/1980 | Carides et al. | 429/194 |
| 4,302,518 | 11/1981 | Goodenough et al. | 429/194 X |
| 4,340,652 | 7/1982 | Raistrick et al. | 429/218 X |

*Primary Examiner*—Anthony Skapars
*Attorney, Agent, or Firm*—Bucknam and Archer

[57] ABSTRACT

Utilization of $Fe_2O_3$, or more generally $M_2O_3$ materials, after suitable electrochemical reaction with lithium, as improved non-metal lithium electrodes for the realization of lithium rechargeable batteries. These materials may be used as negative electrodes in replacement of lithium metal or lithium alloys in batteries using organic electrolytes, with the specific advantages of avoiding passivation and dendritic deposition effects during cycling.

6 Claims, 7 Drawing Figures

X in Li$_x$Fe$_2$O$_3$

FIG. 4a
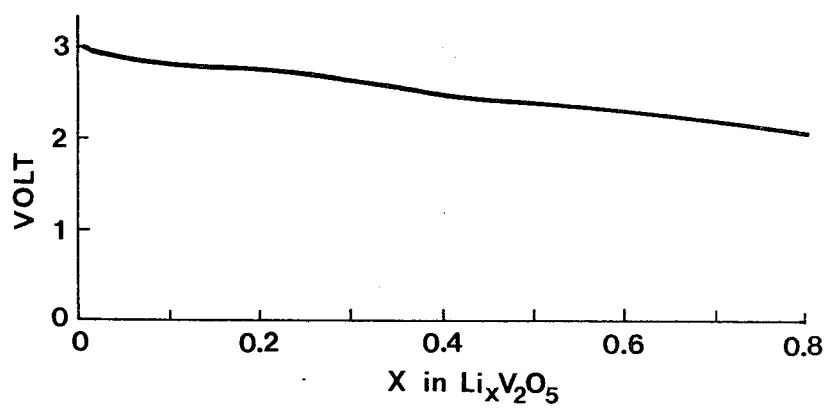
X in $Li_xV_2O_5$
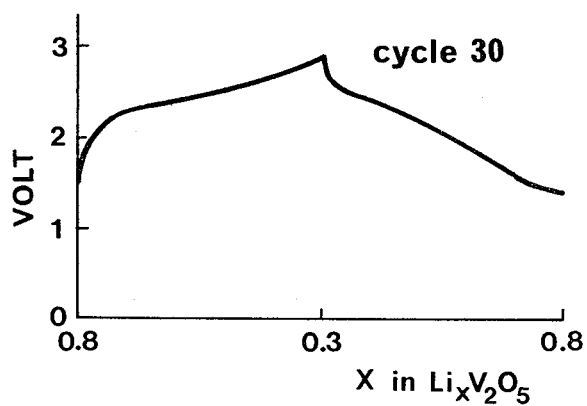
X in $Li_xV_2O_5$
FIG. 4b

RECHARGEABLE LITHIUM BATTERIES WITH NON-METAL ELECTRODES

This application is a continuation-in-part of application Ser. No. 178,775, filed Aug. 18, 1980, the priority of which is claimed under 35 U.S.C. 120.

BACKGROUND

Lithium-organic electrolyte secondary batteries suffer of limited rechargeability mainly due to the poor cyclability of the lithium metal electrode. In fact lithium is unavoidably attacked and/or passivated by any organic electrolyte: this results in non-uniform lithium deposits which, on cycling, assume a progressively dendritic morphology. Furthermore, part of the deposited lithium is isolated from the substrate and thus cannot be electrostripped in the subsequent discharge; accordingly, the cycling efficiency rapidly declines.

A possible solution to this problem consists in replacing the lithium metal electrode with a non-metal lithium electrode having no tendency to be attacked and/or passivated by the organic electrolyte. This approach has been proposed in the particular case of rechargeable lithium batteries based on two dichalcogenide electrodes (U.S. Pat. No. 4,194,062). However, in order to attain high-voltage, high-energy density lithium batteries, the non-metal negative electrode must fulfil the following requirements:

high lithium activity, i.e. low voltage when coupled with lithium;
high capacity, i.e. a high number of lithium equivalents which can reversibly react per mole of electrode material;
small voltage variation during operation;
fast lithium exchange, i.e. high power;
low specific weight.

These requirements are not simultaneously fulfilled by the transition metal chalcogenides which have been so far proposed as positive electrodes (U.S. Pat. No. 4,035,555) or both for negative and positive electrodes (U.S. Pat. No. 4,194,062).

SUMMARY OF THE INVENTION

According to the present invention, a non-aqueous secondary lithium cell uses as the negative electrode a material $Li_xM_2O_3$* obtained by electrochemically reacting with lithium a metal oxide of the $M_2O_3$ type, where M is Co, Fe, Cr. The composition of the material $Li_xM_2O_3$ may vary within the range $1.0 \leq x \leq 5.5$. The positive electrode may be selected from various classes of materials, according to the desired voltage and performances of the cell.

*The notation $Li_xM_2O_3$ used throughout this application does not imply any hypothesis about the mechanism of the reaction of lithium with $M_2O_3$.

BRIEF DESCRIPTION OF THE DRAWINGS

FIG. 4a and 4b show the cell voltage during discharge and the recycling behaviour at 0.5 mA cm$^{-2}$ of a $Li_{6-x}Fe_2O_3/LiClO_4,PC/Li_xV_2O_5$ cell at room temperature.

**PC=propylene carbonate

DETAILED DESCRIPTION

Figure 1:
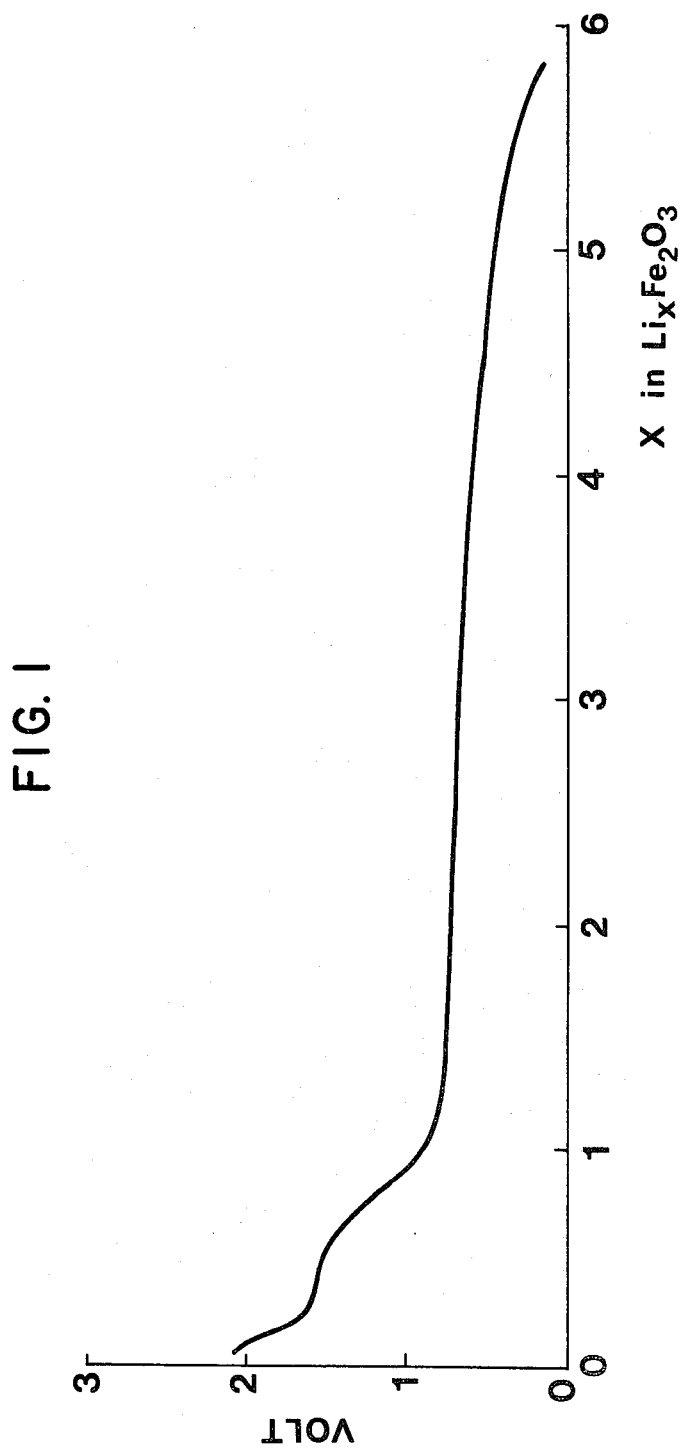
FIG. 1 shows the cell voltage, as a function of the depth of discharge, of a $Li/LiClO_4,PC**/Li_xFe_2O_3$ cell at room temperature.

It has been discovered that the oxides of the $M_2O_3$ type where M is Co, Fe, Cr and related elements can react electro-chemically with lithium, and the resulting materials, which are here indicated as $Li_xM_2O_3$, fulfil the requirements previously mentioned for a non-metal negative electrode in lithium secondary cells. In FIG. 1, as a typical example, the discharge curve of the cell $Li/LiClO_4,PC/Fe_2O_3$ at 0.25 mA cm$^{-2}$ and at room temperature is shown. A typical electrolyte, such as $LiClO_4,PC$, has been chosen for assembling this cell and the others quoted in the following examples, but any electrolyte which is stable with respect to the electrode materials and has a sufficiently low resistivity may be employed. The curve of FIG. 1 illustrates the capability of this electrode material to react with a large amount of lithium with a small voltage variation, especially for lithium content higher than 1 and lower than 5.5 equivalents of lithium per $Fe_2O_3$ mole. The latter feature (high capacity) and the low and almost constant voltage with respect to lithium, are particularly significant when compared with those of known intercalation materials which can operate in the same voltage range.

Figure 2A:
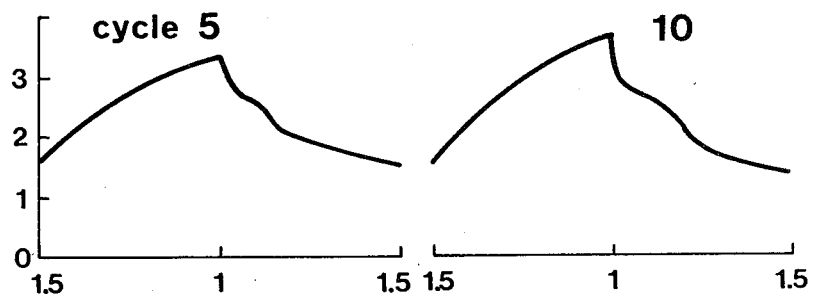
FIGS. 2a through 2c show a cycling test, at a current density of 0.25 mA cm$^{-2}$ of a $Li/LiClO_4,PC/Li_xFe_2O_3$ cell around various lithium concentrations at room temperature.
Figure 2B:
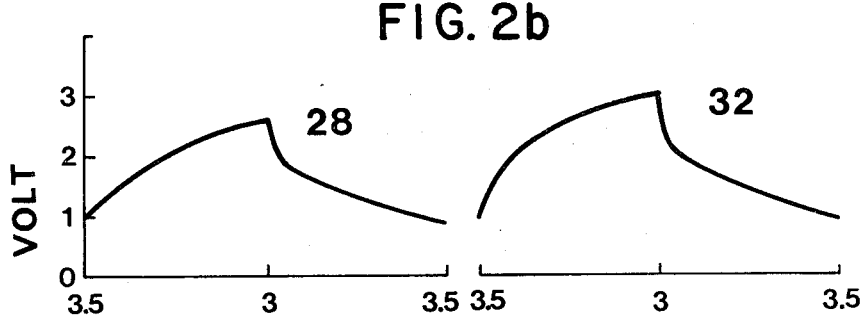
Figure 2C:
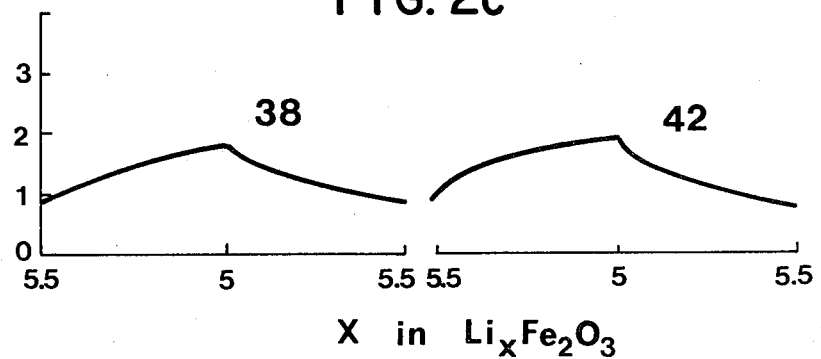

Furthermore the reaction with lithium is highly reversible as indicated in the example of FIG. 2, where the cycling behaviour of $Fe_2O_3$ around various compositions is shown. It is apparent that the cycling behaviour improves in the range of medium-high lithium activity, i.e. just where the application of the material as an alternative to the lithium electrode is optimised.

The active material may be prepared electrochemically by discharging cells of the type $Li/LiClO_4,PC/Fe_2O_3$ (see FIG. 1), where $Fe_2O_3$ is preferably in the alpha phase; the discharge is interrupted when the desired composition $Li_xFe_2O_3$ is reached. The active material may then be removed and used as the negative electrode in another cell. For the realisation of the latter, positive electrodes may be selected from various classes of materials, such as transition metal dichalcogenides ($TiS_2$, $NbS_2$, $TaS_2$, $VS_2$, etc.), metal oxides ($TiO_2$, $MoO_3$, $WO_3$, etc.), and related compounds. The choice of the positive is made according to the desired performances (voltage, specific capacity, energy and power) of the battery.

FIGS. 3a, 3b, and 4a, 4b show typical examples of cells obtained by coupling $Li_6Fe_2O_3$ with two intercalation positives.

Figure 3A:
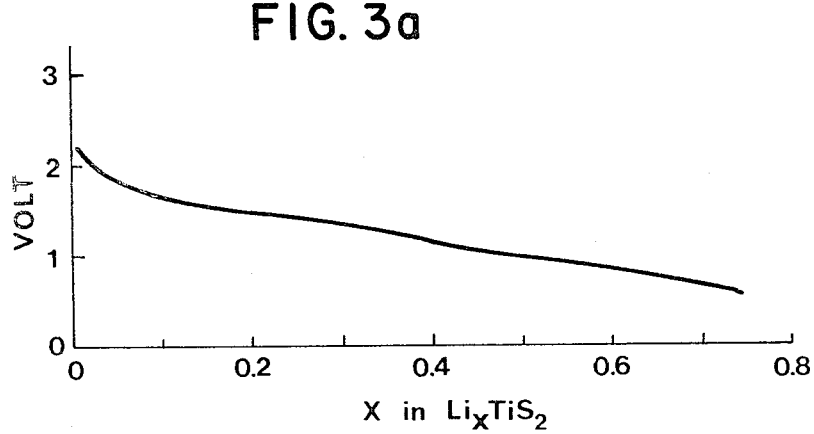
FIGS. 3a and 3b show the cell voltage during discharge and the cycling behavior at 0.5 mA cm$^{-2}$ of a $Li_{6-x}Fe_2O_3/LiClO_4,PC/Li_xTiS_2$ cell at room temperature.
Figure 3B:
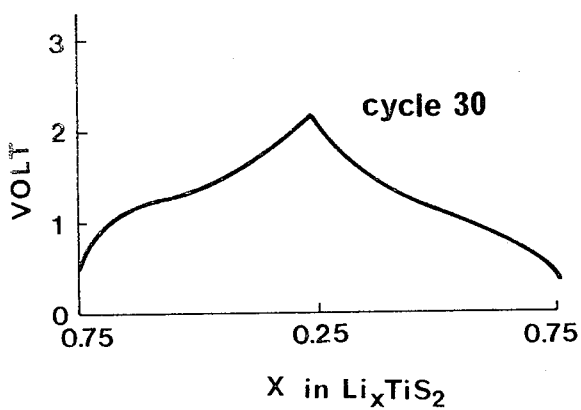

FIGS. 3a and 3b the behaviour of the cell $Li_{6-x}Fe_2O_3/LiClO_4,PC/Li_xTiS_2$ is reported: the curve a is the discharge curve of the cell at 0.5 mA cm$^{-2}$ at room temperature, while b is a typical cycle at the same current density. The corresponding performances of the cell $Li_{6-x}Fe_2O_3/LiClO_4,PC/Li_xV_2O_5$ are reported in FIGS. 4a and 4b.

We claim:

1. A rechargeable lithium battery with non-metal electrodes which comprises a positive electrode, a negative electrode and a non-aqueous electrolyte, said negative electrode being a material of the formula $Li_xM_2O_3$ where M is a transition metal and x ranges from 1 to 6, said material being obtained by electrochemically reacting with lithium a metal oxide of the formula $M_2O_3$.

2. The battery according to claim 1, wherein M is Fe.

3. The battery according to claim 1, wherein M is Co or Cr.

4. The battery according to claim 1, wherein x ranges from 0.1 to 5.5.

5. The battery according to claim 1, wherein said non-aqueous electrolyte is $LiClO_4$ in propylene carbonate.

6. The battery according to claim 1, wherein said material of the formula $Li_xM_2O_3$ is prepared by discharging cells of the type $Li/LiClO_4$, propylene carbonate/$Fe_2O_3$.

* * * * *